US006177910B1

(12) United States Patent
Sathoff et al.

(10) Patent No.: US 6,177,910 B1
(45) Date of Patent: Jan. 23, 2001

(54) LARGE BORE DRIVE MODULE

(75) Inventors: J. Blake Sathoff, Palos Verdes Estates; Mark A. Carroll, Newport Beach; Michael R. Stark, Redondo Beach, all of CA (US)

(73) Assignee: TRW Inc., Redondo Beach, CA (US)

( * ) Notice: Under 35 U.S.C. 154(b), the term of this patent shall be extended for 0 days.

(21) Appl. No.: 09/070,376

(22) Filed: Apr. 30, 1998

(51) Int. Cl.[7] .............................. G01M 13/02; H01Q 3/08
(52) U.S. Cl. .............................. 343/766; 73/162; 343/765
(58) Field of Search ..................................... 343/766, 705, 343/765; 352/214, 206; 414/223; 73/162

(56) References Cited

U.S. PATENT DOCUMENTS

| | | | | |
|---|---|---|---|---|
| 4,725,942 | | 2/1988 | Osuka | 364/158 |
| 4,797,835 | | 1/1989 | Kurami et al. | 364/513 |
| 5,025,262 | * | 6/1991 | Abdelrazik et al. | 343/705 |
| 5,049,796 | | 9/1991 | Seraji | 318/568.1 |
| 5,481,910 | * | 1/1996 | Gutman | 73/162 |
| 5,546,302 | | 8/1996 | Wang et al. | 364/148 |
| 5,633,987 | | 5/1997 | Teng et al. | 395/22 |
| 5,850,277 | * | 12/1998 | Dang et al. | 352/214 |

* cited by examiner

*Primary Examiner*—Don Wong
*Assistant Examiner*—James Clinger
(74) *Attorney, Agent, or Firm*—Michael S. Yatsko

(57) ABSTRACT

A drive module comprising an elbow formed of composite material and having two generally tubular legs having a large bore. On one leg, elbow supports an azimuth drive module also formed in a generally tubular configuration and have a large bore. On the other leg, elbow supports an elevation drive module also formed in a generally tubular configuration and having a large bore. The respective modules are operatively connected to an outside diameter of the respective legs. Azimuth drive module and elevation drive module include motors which when energized enable displacement of the respective legs in order to control the azimuth and elevation of elbow to enable pointing of a structure, such as an antenna as may be located on a second elbow.

23 Claims, 10 Drawing Sheets

130

| Ply Number | Ply Orientation | Mat'l Spec Cen Note |
| --- | --- | --- |
| (-1024) | | |
| (-1023) | | |
| -(1022) | | |
| (-1021) | | |
| (-1020) | | |
| (-1019) | | |
| (-1018) | | |
| (-1017) | | |
| (-1016) | | |
| (-1015) | | |
| (-1014) | | |
| (-1013) | | |
| -1036 | +60° | 1 |
| -1035 | 0° | 1 |
| -1034 | -60° | 1 |
| -1033 | -60° | 1 |
| -1032 | 0° | 1 |
| -1031 | +60° | 1 |
| -1030 | +60° | 1 |
| -1029 | 0° | 1 |
| -1028 | -60° | 1 |
| -1027 | -60° | 1 |
| -1026 | 0° | 1 |
| -1025 | +60° | 1 |

Layup Configuration

128

| Ply Number | Ply Orientation | Mat'l Spec Cen Note |
| --- | --- | --- |
| -1024 | +60° | 2 |
| -1023 | 0° | 2 |
| -1022 | -60° | 2 |
| -1021 | -60° | 2 |
| -1020 | 0° | 2 |
| -1019 | +60° | 2 |
| -1018 | +60° | 2 |
| -1017 | 0° | 2 |
| -1016 | -60° | 2 |
| -1015 | -60° | 2 |
| -1014 | 0° | 2 |
| -1013 | +60° | 2 |
| -1012 | +60° | 1 |
| -1011 | 0° | 1 |
| -1010 | -60° | 1 |
| -1009 | -60° | 1 |
| -1008 | 0° | 1 |
| -1007 | +60° | 1 |
| -1006 | +60° | 1 |
| -1005 | 0° | 1 |
| -1004 | -60° | 1 |
| -1003 | -60° | 1 |
| -1002 | 0° | 1 |
| -1001 | +60° | 1 |

Layup Configuration

LARGE BORE DRIVE MODULE

FIELD OF THE INVENTION

The present invention relates to an apparatus for aiming electromagnetic or optical energy, and more particularly, to a high precision gimbal drive module for allowing a large aperture through the center of an articulating gimbal and having extremely accurate pointing ability, exceptional thermal stability, and high stiffness.

DISCUSSION

In spacecraft design, spacecraft payload weight and stowage space are two critical components to designing an efficient, cost effective spacecraft. Spacecraft payload weight must be kept to a minimum so that engines and fuel tanks of reasonable size, weight and cost can be used to launch the spacecraft into orbit and to require minimal engine and fuel input to maintain the spacecraft in the desired orbit and orientation. For similar reasons, stowage space is kept at a minimum to reduce the overall size of the spacecraft, thereby reducing inertia and further minimizing launch and orbit engine requirements.

Regardless of the primary purpose of the spacecraft, almost all spacecraft communicate with either other spacecraft or ground stations, either directly or indirectly. In order to communicate with other spacecraft or ground stations, the spacecraft typically includes some form of electromagnetic or optical communication system to send and receive electromagnetic or optical energy. A typical communication system includes an antenna mounted on the outboard end of a boom or gimbal. The boom or gimbal typically moves through an azimuth and an elevation angle range so that the antenna may be pointed in the desired direction for radiating either electromagnetic or optical energy in the direction of the other spacecraft or ground station. As the spacecraft moves through an orbit, the pointing angle toward the other spacecraft or ground station varies. The change in angle requires that the antenna be redirected in order to maintain electromagnetic or optical communication with the other spacecraft or ground station. This constant redirection of the antenna requires precise movement of the antenna through the boom or gimbal in order to maintain communication with the other spacecraft or ground station.

As discussed above, two primary considerations in spacecraft design are weight and stowage space. Thus, the boom or gimbal system for positioning the antenna is preferably light weight and preferably is relatively small to minimize the required stowage space. Further, because pointing some electromagnetic or optical propagation systems requires extreme accuracy, the boom or gimbal must be extremely stiff throughout its structure in order to maintain the precise aiming required for effective electromagnetic or optical communications.

Further yet, because some communication systems, whether optical or electromagnetic, require propagation of waves though tubes or waveguides of relatively large size, a communication system must be adaptable to accommodate such requirements. In particular, the communication system typically generates and/or receives electromagnetic or optical waves which are then output or received by an antenna or other device toward or from the remote spacecraft or ground station. Propagation of these waves preferably occurs through the boom or gimbal to which the antenna or other device is mounted. For example, some applications require a boom or gimbal having an inner diameter of at least 7 inches in order to propagate waves between the antenna or other device and associated communication circuitry. Such requirements make it even more essential that the drive modules that control the boom or gimbal be configured to have a low profile to make it feasible for the spacecraft to carry such a large bore boom of support. Such large bore booms or gimbals also require extreme thermal stability and the maximum stiffness possible.

Thus, there is a need for a boom or gimbal for a spacecraft or ground station which has a relatively large interior section, but is lightweight, thermally stable, and sufficiently stiff in order to support precise electromagnetic or optical communication. Further, it is desirable that a low profile drive module be provided for the boom or gimbal which is displaceable in extremely small angle increments to provide the precise pointing required by some electromagnetic or optical energy propagation and receiving systems. Further, such a system should exhibit relatively low friction and have a controller specifically designed to generate control commands to precisely position the boom or gimbal in a manner responsive to the friction characteristics of the drive module.

SUMMARY OF THE INVENTION

This invention is directed to a large bore drive module including a first drive motor having a first fixed assembly and a first displaceable assembly for movement relative to the first fixed assembly. The first drive motor is arranged in a generally tubular configuration and has a large center bore. A generally tubular support is partially inserted into the interior of the first drive motor. The tubular support is connected to an inner diameter of the first displaceable assembly and moves in accordance with the first displaceable assembly. The generally tubular support has a large center bore in accordance with center bore of the first drive motor. The generally tubular support includes a first leg and a second leg attached at a joint to form an angle between the first and second legs, and the first and second legs of the tubular support are formed of a composite material. The first drive motor is connected to the first leg of the tubular support. A second drive motor is provided and has a second fixed assembly and a second displaceable assembly for movement relative to the second fixed assembly. The second drive motor is arranged in generally tubular configuration having a large center bore, and the fixed assembly is connected to the second leg of the tubular support. For each drive motor, an annularly shaped position encoder is connected to an outside diameter of the tubular support and moves with the respective drive motor. The position encoder has a grating formed on it. A read station emits light onto the position encoder and receives light reflected from the position encoder. The read station generates an output signal based on the reflected light.

Additional objects, features, and advantages of the present invention will become apparent from the following description and the appended claims, taken in conjunction with the accompanying drawings.

DETAILED DESCRIPTION OF THE INVENTION

Figure 1:
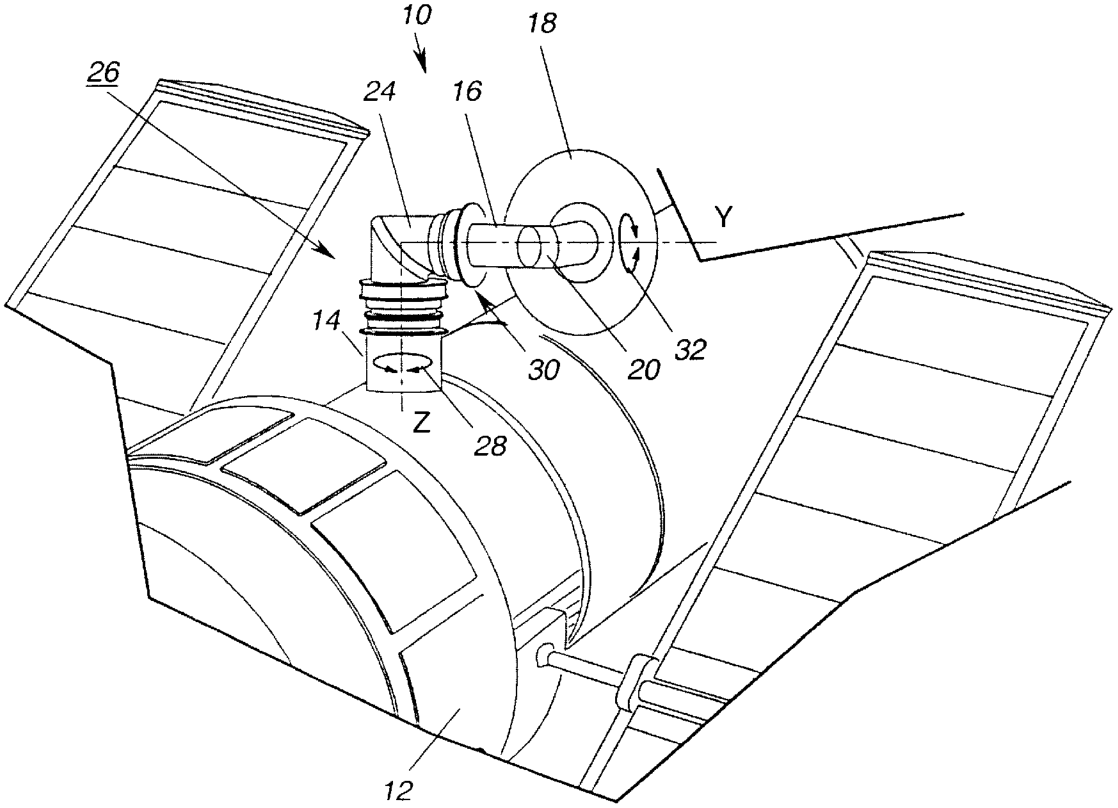
FIG. 1 is an isometric view of the large aperture precision gimbal.
Figure 2:
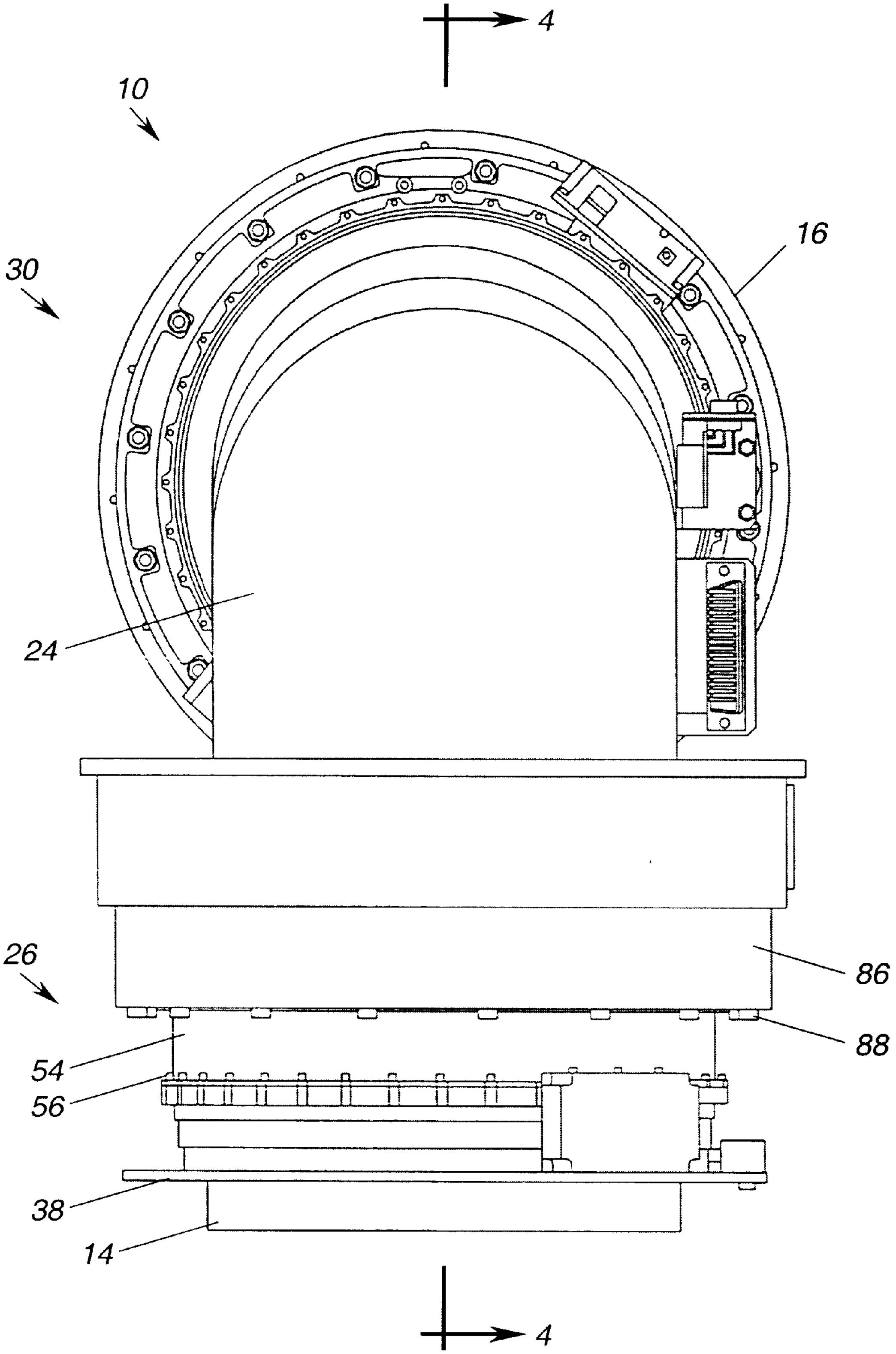
FIG. 2 is a front view of the gimbal of FIG. 1.
Figure 3:
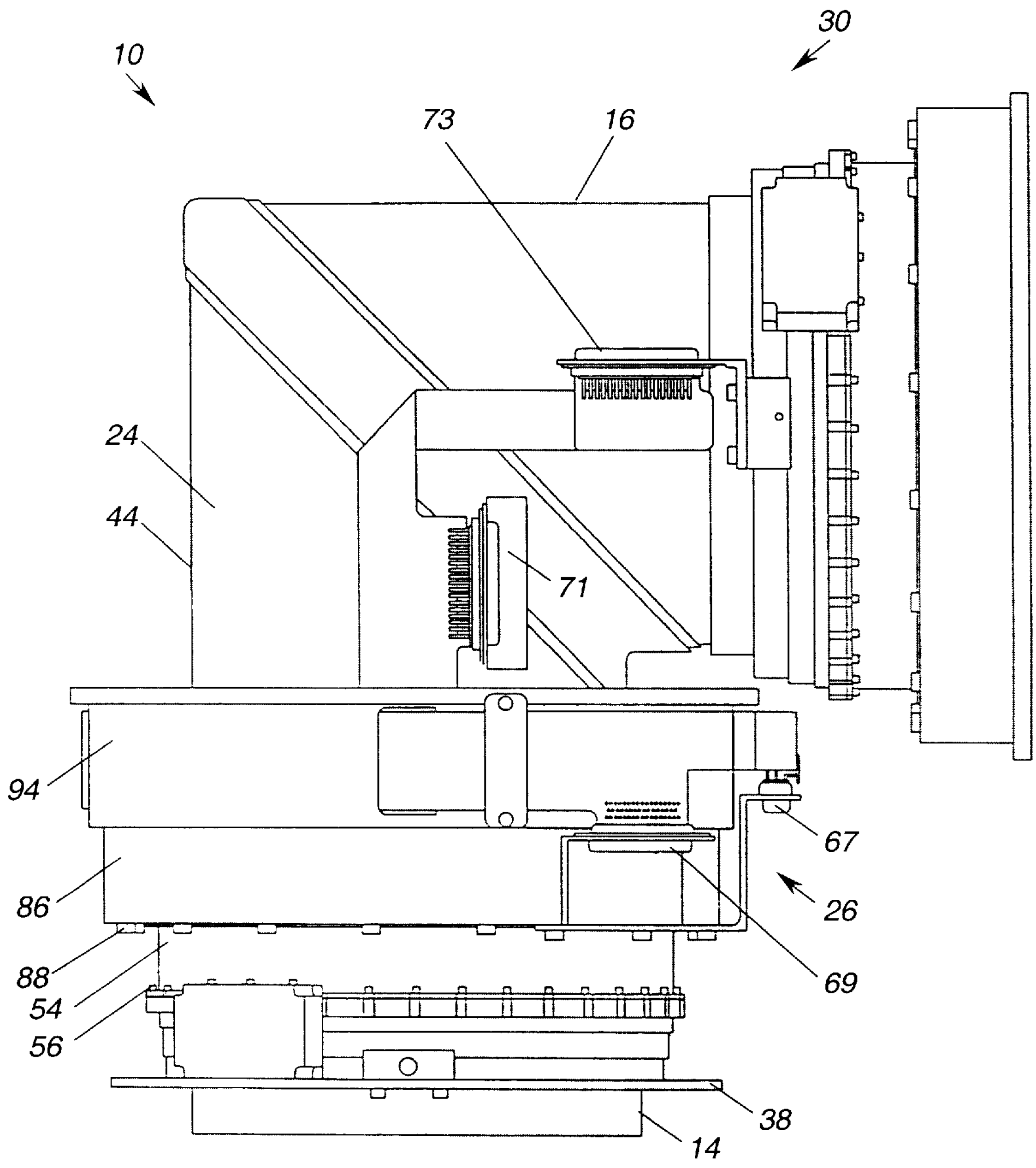
FIG. 3. is a side view of the gimbal of FIG. 1.
Figure 4:
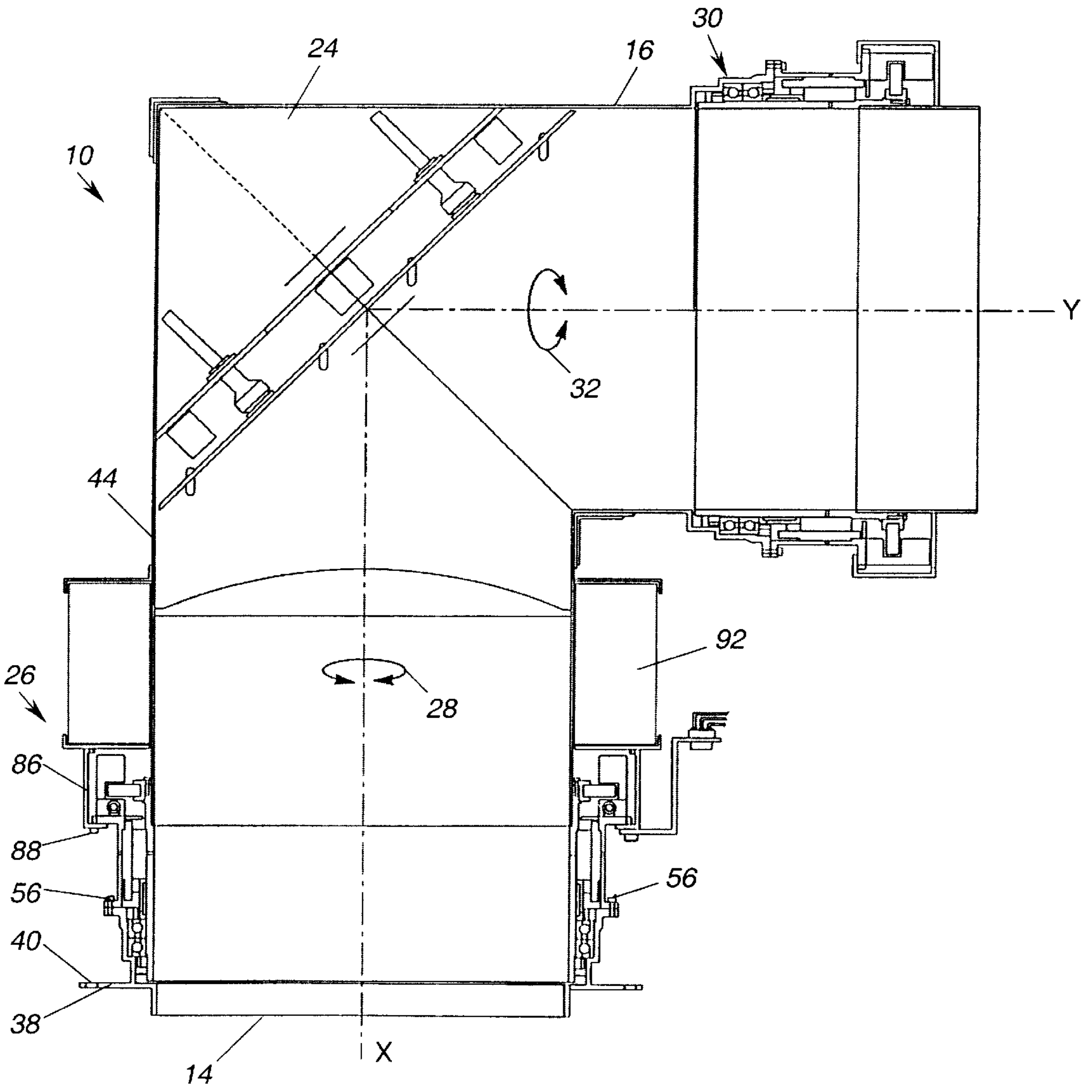
FIG. 4 is a cross-sectional view of the gimbal taken along line 4—4 of FIG. 2.

With reference to FIGS. 1–4, a two-axis gimbal 10 is arranged in accordance with the principles of the present invention. Two-axis gimbal 10 preferably connects to a spacecraft or satellite 12 at an inboard end 14. An outboard end 20 may be adapted to receive an antenna 18. Although the gimbal drive module system 10 will be described herein as supporting an antenna 18, one skilled in the art will recognize that gimbal drive module system 10 may be used with any device for which highly accurate pointing or other positioning is required, including electromagnetic and optical transmitting and receiving systems.

The two-axis gimbal 10 includes two elbows 16, 24, formed preferably at a 90 degree angle and formed of two intersecting legs. Also included are two drive modules 26, 30 forming two axes of control. Elbows 16, 24 are preferably formed of composite material, such as a graphite-epoxy laminate, having a low coefficient of thermal expansion (CTE), making elbows 16, 24 sufficiently thermally stable. Preferably elbows 16, 24 are formed of material also providing very high stiffness, as will be described herein in greater detail. Inboard end 14 supports an azimuth drive module 26 having a azimuth motor which causes rotation of elbow 24 in the direction of line 28 about the axis Z. Similarly, outboard end 20 of elbow 24 supports an elevation drive module 30 having an elevation motor which causes rotation of elbow 16 and antenna 18 in the direction of line 32 about the axis Y. As will become apparent, the azimuth and elevation modules 26, 30 cooperate to displace antenna 18 to provide directional control of antenna 18 so that antenna 18 may be pointed at a particular spacecraft or ground station.

Figure 5:
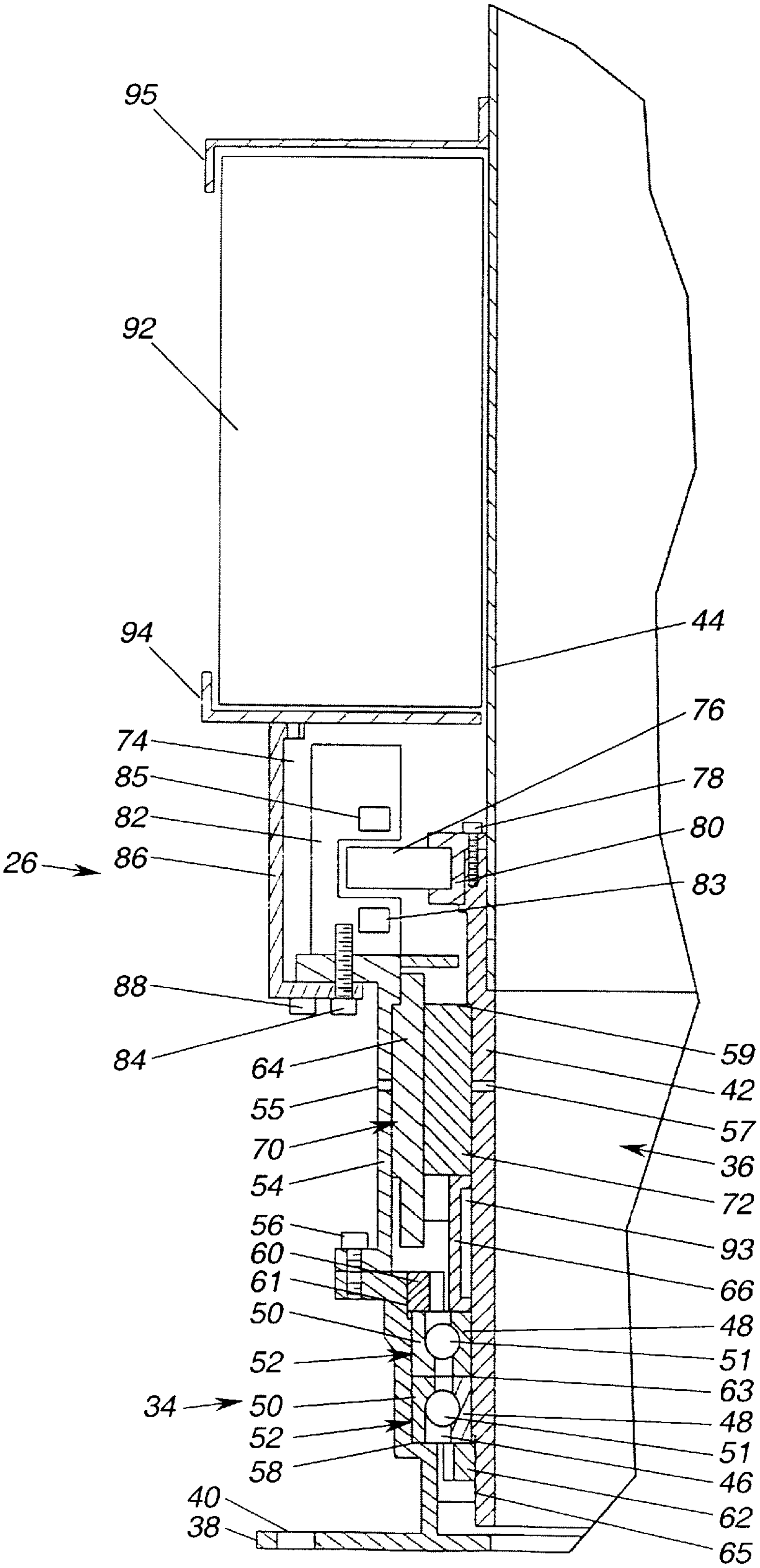
FIG. 5 is an enlarged view of the azimuth drive module of FIG. 4.

With particular reference to FIG. 5, an expanded view of azimuth drive module 26 is shown. One skilled in the art will recognize that cross-sectional view FIG. 4 and expanded view FIG. 5 represent, with exception for selected elements to be noted, a typical view of any cross-section through the two-axis gimbal 10. That is, the elements described in FIG. 5 are generally axisymmetric about a respective axis for gimbal drive module 10. Azimuth drive module 26 includes a fixed assembly 34 and a displaceable assembly 36. As described herein, azimuth drive module assembly 26 is substantially similar to elevation drive module 30, with selected variations as will be described further herein.

Fixed assembly 34 comprises the following major components which remain generally fixed: bearing housing 38, outer bearing races 50, outer bearing retainer 60, motor stator housing screws 56, motor stator housing 54, motor stator 64, encoder read station screws 84, encoder housing 86, encoder read station 82, encoder housing screws 88, and inner cablewrap guide 94, as will be described further herein. Bearing housing 38 has a plurality of mounting holes 40 through which mounting bolts (not shown) pass for attaching azimuth drive module 26 and two-axis gimbal 10 to a spacecraft 12 as in FIG. 1, or to a ground station. Tubular shaft 42 is bonded to a vertical section 44 of elbow 24. Tubular shaft 42 is preferably formed of titanium and is bonded over the outer diameter of vertical section 44 of elbow 24. Tubular shaft 42 and bonded elbow 24 interconnect to form displaceable assembly 36.

Tubular shaft 42 is inserted within bearing housing 38 and with the inner and outer spanner nuts forms a space therebetween to define a bearing cage 46. Bearing cage 46 accommodates a pair of ball bearing sets comprising a pair of inner races 48 and outer races 50. A plurality of balls 51 are placed between inner races 48 and outer races 50 to define bearing sets 52 to enable relative rotation between fixed assembly 34 and displaceable assembly 36. A stator housing 54 connects to bearing housing 38 and is held in place using a plurality of bolts 56. An outer bearing retainer 60 threadably engages threads formed on an inner surface 61 of bearing housing 38 to upwardly support outer races 50. A shoulder 58 in bearing housing 38 downwardly supports outer races 50. A inner bearing retainer 62 threadably engages the outer surface 63 of tubular shaft 42 to downwardly support inner races 48. Inner races 48 are upwardly supported by a spacer 66. Spacer 66 is upwardly supported by rotor 72 which in turn is downwardly supported by shoulder 59 in tubular shaft 42. Spacer 66 also defines a cavity for a reservoir 93 for storing and releasing lubricant to further reduce friction. Preferably, the bearing sets described herein have a preload induced by removing material from abutting surfaces 63 of inner races 48. This results in a preload on the bearing sets, increasing stiffness within the drive module 26.

Displaceable assembly 36 comprises tubular shaft 42, composite elbow 24, vertical leg 44, ball bearing rows 51, inner bearing races 48, spacer 66, lubricant reservoir 64, motor rotor 72, encoder disk mount 80, encoder disk mount screws 78, encoder disk 76, cablewrap cable 92, outer cablewrap guide 95, and inner bearing retainer 62. Displacement of tubular shaft 42 and elbow 24 is achieved by bonding stator 64 of motor 70 to stator housing 54, which is fixed to bearing housing 38. Bonding is achieved by injecting adhesive into injection hole 55. Rotor 72 of motor 70 is correspondingly bonded to tubular shaft 42 which, as described above, is bonded to vertical section 44 of elbow 24. Bonding is achieved by injecting adhesive into injection hole 57. When motor 70 is energized, rotor 72 moves with respect to stator 64, which is fixed, resulting in rotational movement of tubular shaft 42 and attached elbow 24.

Motor 70 is preferably a low profile motor having minimal magnetic cogging. Preferably, motor 70 is a constant reluctance, direct-drive, surface-wound motor having air-stabilized neodymium iron boron magnets. Further, the motor preferably has low torque ripple to facilitate precise pointing control. As will be understood to those skilled in the art, stator 64 has a plurality of copper windings which are energized in order to displace rotor 72 with respect to stator 64. Preferably, motor 70 has primary and redundant windings, each with 64 poles in order to allow precise positioning of elbow 24.

Figure 6:
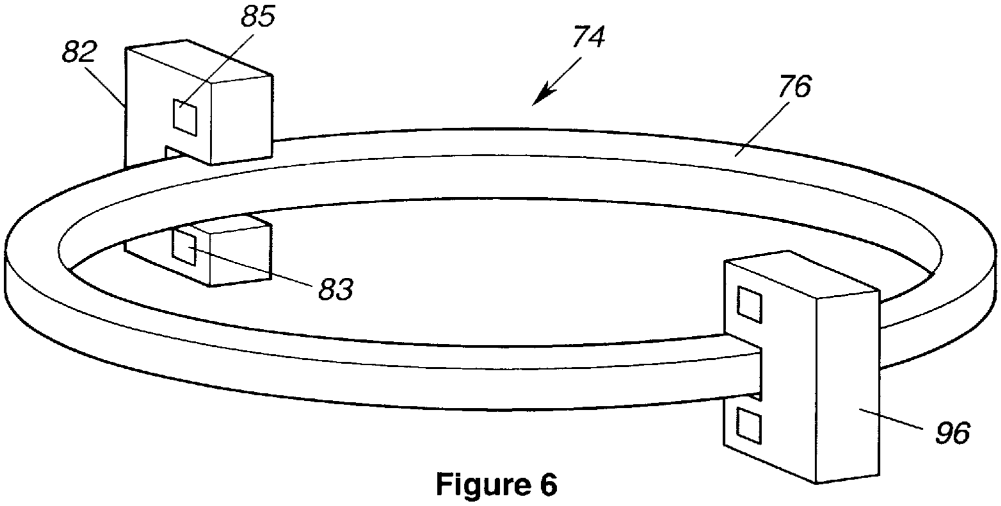
FIG. 6 is a perspective view of the encoder disk of the azimuth drive module and the associated read stations of FIG. 5.

In order to determine the magnitude of the displacement of displaceable assembly 36 relative to fixed assembly 34, so that extremely precise position control can be achieved, an optical, interferometric encoding system 74 is employed. As shown in FIGS. 5 and 6, interferometric encoding system 74 includes an encoder disk 76 clamped to the end of tubular shaft 42 using a bolt 78 to secure a clamp 80. Encoder disk 76 moves in accordance with displaceable assembly 36. A particular feature of the present two-axis gimbal 10 is that encoder disk 76 is annularly shaped having an unobstructed, circular through-hole of greater than 7 inches in a preferred embodiment, while confining the encoder hardware, as will be described, to relatively small annulus, thereby minimizing on-board encoder inertia, and weight. In a preferred embodiment, encoder disk 76 is made of soda-lime glass with an inner diameter of 7.75 inches and an outer diameter of 9 inches. Encoder disk 72 is etched, preferably using an ion-beam process to produce 72,000 grating lines per revolution with a spacing of approximately ten micrometers. The resulting interference pattern for the interferometric encoder system 74 includes approximately 144,000 optical fringes per revolution.

Read stations 82, 96 are mounted to stator housing 54 via mounting screws 84. Encoder station 74 is protected by an encoder housing 86 which is bolted to stator housing via a plurality of mounting bolts 88. In operation, the pair of read stations 82, 96 are placed diametrically opposed to each other to average out any eccentricity errors between the encoder axis and the mechanical axis of the displaceable assembly 36. Read stations 82, 96 are disposed in only two positions circumferentially about elbow 24 and do not traverse a circumference of the drive module.

Figure 7:
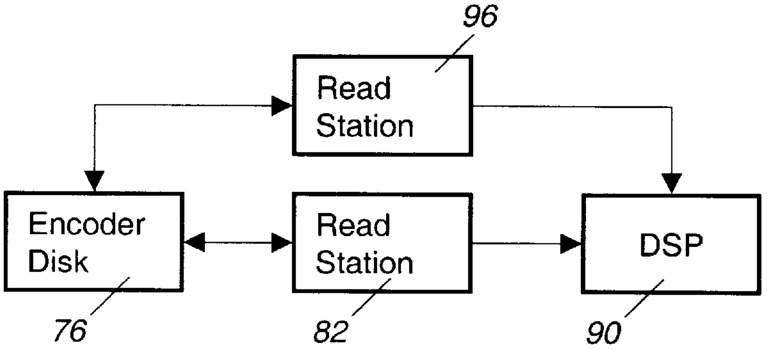
FIG. 7 is a block diagram of the system for decoding position information provided from the encoder disk.

With reference to FIGS. 6 and 7, read station 85 has an emitter 83 which outputs an optical signal through encoder disk 76. The optical signal passes through the diffraction grating lines of encoder disk 76 to generate an interferometric fringe pattern detected by detector 83. Read stations 82 and 96 interpret the interferometric fringe pattern output and outputs the two signals to the digital signal processor (DSP) 90. DSP 90 interpolates position between the optical fringes up to 4096 counts per optical fringe at a rate of 40 kiloHertz (kHz) for each read station and averages their output. This produces a total encoder resolution of approximately $6.1\times10^{-7}$ degrees (0.0022 arc sec). The DSP 90 preferably is capable of maintaining an incremental fringe count up to a maximum rotation rate of 500 degrees per second and can sustain full resolution at rates up to 25 degrees per second.

Referring back to FIG. 3, electrical power and signal connections between azimuth and elevation drive modules and the associated spacecraft are applied separately to minimize the effect of noise from power lines on signal lines. Power connection to the elevation drive module 30 is made to connector 67 of azimuth drive module 26. Similarly signal connection to the elevation drive module 30 is made to connector 69 of azimuth drive module 26. In azimuth drive module 26, if displaceable assembly 36 rotates through, for example, 340 degrees relative to fixed assembly 34, applying signal and power connections to elevation drive module 30 requires a connection that enables and adapts to such rotation. In particular any electrical connection to elevation drive module 30 requires a connection that accommodates such rotation. To compensate for rotation of elbow 24 about axis Z in FIG. 1, electrical connection to elevation drive module 30 occurs in the azimuth drive module 26 using cablewrap cable 92, as shown in FIG. 5. Connectors 71 and 73 are separate connectors of cablewrap cable 92 for electrical power and signal lines and enable connection of electrical power and signals to elevation drive module 30. Cablewrap 92 is housed within a cablewrap cage 94. Cablewrap 92 is a spiral-type wound cable within cablewrap guides 94 and 95. Inner cablewrap guide 94 is fixed to encoder housing 86 and outer cablewrap guide 95 is fixed to vertical section 44 of elbow 24.

The spiral-type flat cablewrap cable 92 is formed in a clock-spring arrangement so that when displaceable assembly 36 rotates in a first direction cablewrap cable 92 tightens around vertical section 44 of elbow 24. Conversely, when displaceable assembly 36 rotates in the opposite direction, cablewrap cable 92 is unwound and presses radially outward against cablewrap guides 94 and 95. In a preferred embodiment, cablewrap cable 92 is a flat-flex cable selected for low overall volume, stiffness, and friction. More particularly, for applications requiring few power or signal lines, cablewrap cable 92 may be embodied as a Kapton sandwich flat-flex cable having a thickness of 0.457 millimeters and a width of 5.08 centimeters. In a preferred embodiment, approximately 3.1 turns or 2.258 meters of cable are wrapped around vertical section 44 of elbow 24 and clamped to the inside of cablewrap guide 94. Such an arrangement provides greater than 350 degrees of total travel. Mechanical stops (not shown) may be installed to limit total travel of displaceable assembly 36 to assist in protecting cablewrap cable 92 from stress or damage.

Figure 8:
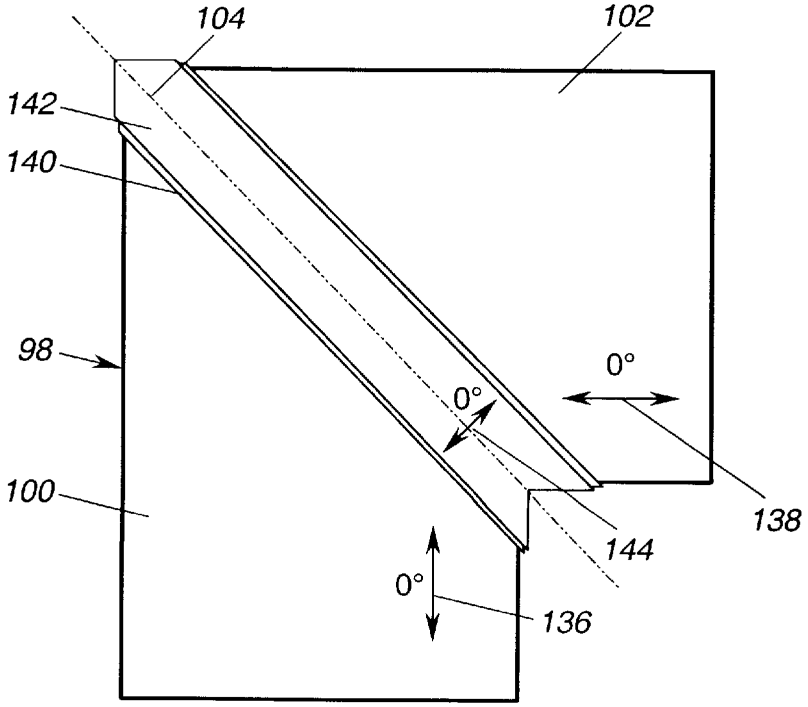
FIG. 8 is a side view of the composite elbow of the precision gimbal drive module.
Figure 9:
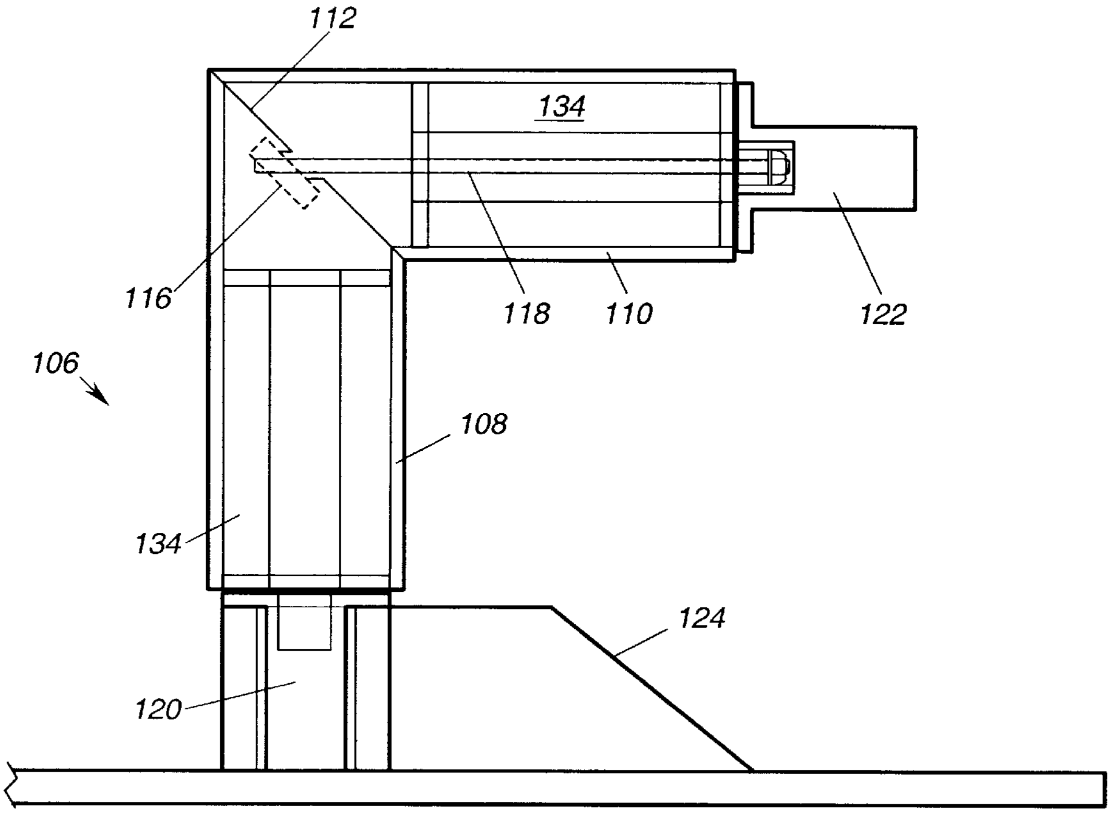
FIG. 9 is a side view of a tool for forming the composite elbow of FIG. 8.
Figure 10:
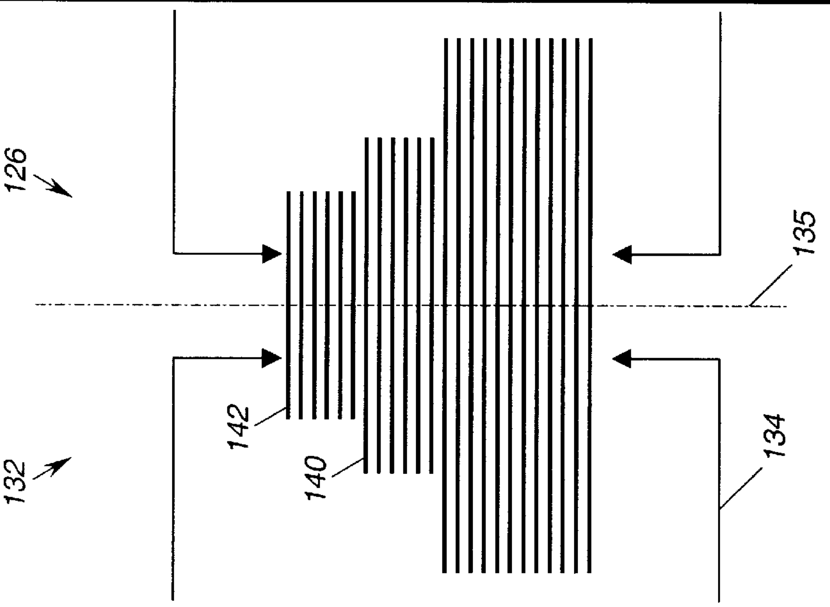
FIG. 10 is a lay-up diagram for manufacture of the composite elbow.

With reference to FIGS. 8–10, the manufacturing of the elbow 24 will be described in detail. The elbow in FIGS. 8–10 will be referred to using reference number 98. Elbow 98 includes a vertical tube 100 and a horizontal tube 102. The horizontal and vertical tubes meet at a joint 104 (shown in phantom), as will be described in greater detail herein. In a particularly novel feature, elbow 98 is manufactured of composite materials such as graphite-epoxy in order to provide an elbow 98 having a acceptable stiffness, low weight and a relatively low coefficient of thermal expansion (CTE). Use of composite materials enables the achievement of these goals.

Elbow 98 is formed on a mandrel 106 of two aluminum cylinders, a vertical aluminum cylinder 108 and a horizontal aluminum cylinder 110. At one end of each cylinder, a cut is made through each cylinder at preferably 45 degrees to the axis of each cylinder. The cut ends are aligned to form a joint 112 which includes a tongue and groove arrangement to improve the fit and stability of joint 112. A threaded nut 116 engages a threaded rod 118 to secure vertical aluminum cylinder 108 to horizontal aluminum cylinder 110 at joint 112. Aluminum cylinders 108 and 110 include extension members 120 and 122, respectively, which facilitate handling and stabilizing mandrel 106. Extension member 120 is placed in a base 124 so that mandrel 106 may be arranged as show in FIG. 9 and allow rotation about vertical axis of cylinder 108 during fabrication of elbow 98.

In order to form elbow 98, a plurality of composite layers, including both fabric and tape are laid up in a predetermined order and orientation upon the respective horizontal and vertical aluminum cylinders 108 and 110. FIG. 10 is a lay-up diagram 126 of a preferred lay-up configuration for elbow 98. Lay-up diagram 126 includes a ply diagram 132 and lay-up tables 128 and 130. Lay-up tables 128 and 130 provide ply orientation and composition information for each particular ply. Ply diagram 132 provides dimensional information for each particular ply. Lay-up diagram 126 is typically read directionally by starting at the tool surface 134 and moving in a direction away from tool surface 134. Tool surface 134 corresponds to the outer surfaces of mandrel 106 on which the respective plies will be laid up.

With particular reference to ply diagram 132, centerline 135 (shown in phantom) corresponds to joint 104 of elbow 98 and joint 112 of mandrel 106. Lay-up tables 128 and 130 call out material specifications in the third column of each table. For a preferred embodiment of the present invention, material specification 1 denotes composite material tape fiber, namely M55J graphite having a matrix of preferably 954-3 cyanate ester and a nominal ply thickness of 0.003 inches. Preferably, the fiber volume for the composite material tape fiber shall be 60% "2%, and ply angles shall be "2 degrees. This composite material tape is referred to as a unidirectional material which provides maximum stiffness in the direction of the fibers. Materials specification 2 refers to composite material fabric fiber, such as 5HS-50A-140 graphite having a matrix RS-3C cyanate ester and a nominal ply thickness of 0.006 inches. The fiber direction of the composite material fabric fiber is indicated by the warp direction of the cloth. This material is referred to as 5 harness satin fabric material.

In lay-up diagram 126, ply numbers −1001 thru −1012 correspond to the plies of vertical tube 100. Orientation of the plies of vertical tube 100 is provided with reference to the axis of vertical tube 100, with 0 degrees demonstrated by arrow 136. Counterclockwise rotation from arrow 136 is a positive angular orientation and clockwise rotation from arrow 136 is a negative angular orientation. Similarly, plies −1025 thru −1036 correspond to plies for horizontal tube 102. Orientation of the plies of horizontal tube 102 is provided with reference to the axis of horizontal tube 102, with 0 degrees demonstrated by arrow 138. In order to provide additional stiffness, elbow 98 is reinforced around joint 104. Reinforcement of joint 104 occurs in a step-wise manner with a first step 140 corresponding to plies −1013 thru −1018 and in a second step 142 corresponding to plies −1019 thru −1024. The step-wise lay-up of the plies to reinforce joint 104 can be viewed in cross-section with reference to ply diagram 132 in which the respective plies are shown for vertical and horizontal tubes 100 and 102, first step 140, and second step 142.

The plies are laid up in accordance with the respective lay-up configuration tables 128 and 130 moving through the table from the bottom to the top. For example, either plies −1001 or −1025 are first laid up on the respective vertical aluminum cylinder 108 or horizontal aluminum cylinder 110 of mandrel 106. Assuming that ply −1001 is applied prior to ply −1025, ply −1001 is laid up along vertical aluminum cylinder 108 in +60 degree orientation (60 degrees counterclockwise from arrow 136) using composite tape as specified in material specification 1. Ply −1001 is cut at joint 104. Following application of ply −1001, ply −1025 is laid up along horizontal aluminum cylinder 110 in a +60 degree orientation (60 degrees counterclockwise from arrow 138) using composite tape as described in material specification 1. Similarly, ply −1025 is cut at joint 104. The process of laying up alternate plies on the respective vertical aluminum tube 108 and horizontal aluminum tube 110 occurs for plies −1001 thru −1012 alternatively with the plies −1025 thru −1036.

Following application of the respective plies to form vertical tube 100 and horizontal tube 102, plies for first step 140, namely plies −1013 thru −1018, are laid up. For example, ply −1013 is laid up using the composite material fabric as described in material specification 2 in a 60 degree orientation (60 degrees counterclockwise from arrow 144). Next, ply −1014 is laid up using the composite material fabric in an orientation along arrow 144 (0 degrees). Next, ply −1015 is laid up in a minus 60 degree orientation (60 degrees clockwise from arrow 144). Following the lay-up of ply −1018, plies −1019 thru −1024 are laid up to form second step 142. These plies are applied as specified in lay-up configuration table 128.

Following lay-up of elbow 98, the mandrel 106 with laid up plies is vacuum bagged to compact the plies and then heated to approximately 350 degrees Fahrenheit in an autoclave oven. The autoclave applies pressure to the laminate and the vacuum bag pulls a vacuum onto the top surface of the laminate. After heating the assembly for 3 hours, resin flows between the respective plies and forms a one-piece laminate elbow 98. During the heating process, the aluminum mandrel 106 expands, further compressing the plies with the vacuum bag. Following the heating and vacuum bagging process, the mandrel 106 is removed and allowed to cool. Because mandrel 106 is formed of aluminum and has a higher CTE than the composite material, vertical aluminum tube 108 and horizontal tube 110, shrink while composite, one-piece elbow 98 remains substantially the same dimension. This facilitates removal of vertical aluminum cylinder 108 and horizontal aluminum cylinder 110, which are removed by disengaging threaded nut 116 from threaded rod 118, thereby enabling simple removal of the respective cylinders.

Figure 11:
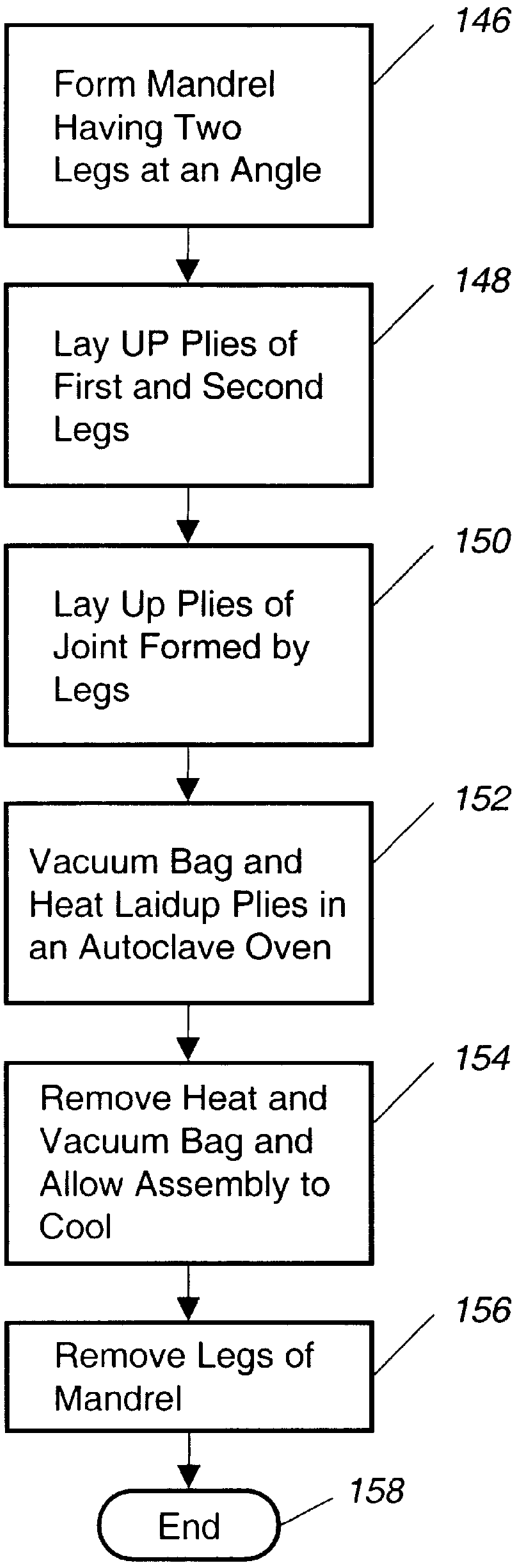
FIG. 11 is a flow diagram of the process for forming the composite elbow.

FIG. 11 is a flow diagram of the process for forming elbow 98. The process starts at step 146 by forming a mandrel having two legs which join at an angle. For example, the legs may join at a 90 degree angle or alternatively, any other angle other than 180°, which forms a straight line. After the mandrel is formed, the plies of the first and second legs are laid up as shown at step 148. As shown in step 150, after the plies of the first and second legs are laid up, the joint is laid up, which may be done in step-wise fashion. As shown in step 152, the laid up plies are then vacuum bagged and heated in an autoclave oven in order to form a composite elbow. After the elbow has been heated and vacuum bagged, the assembly is allowed to cool as shown at block 154. After the assembly is cooled, the legs of the mandrel are separated and removed as shown in block 156. The process terminates at block 158.

One skilled in the art will recognize that the elbow 98 described herein may be formed at angles other than 90 degrees. A particularly relevant feature of elbow 98 and the process for forming elbow 98 is that a cylinder of composite material having two legs that join at an angle may be formed. Further, the elbow described herein has a relatively large internal diameter of approximately 7.25 inches. Fabricating elbow 98 as described herein provides the desired thermal, stiffness, and weight properties for an elbow 98 of these dimensions. One skilled in the art will recognize that the present invention may also be applied to elbows of varying radii. Further, the process described herein is also adaptable to composite cylinders having a large radius joint rather than a small radius joint.

Although the gimbal drive module system 10 is a relatively low friction system which is limited primarily to bearing and cablewrap friction, such friction is often difficult to model and compensate for with traditional feed-forward techniques. Further, because the control system may be used on a spacecraft, simplicity of the control system is important so that simpler, lower speed processors may be used to implement the control system. A traditional proportional-integral-derivative (PID) control system does not adequately compensate for the friction presented in the present system.

Figure 12:
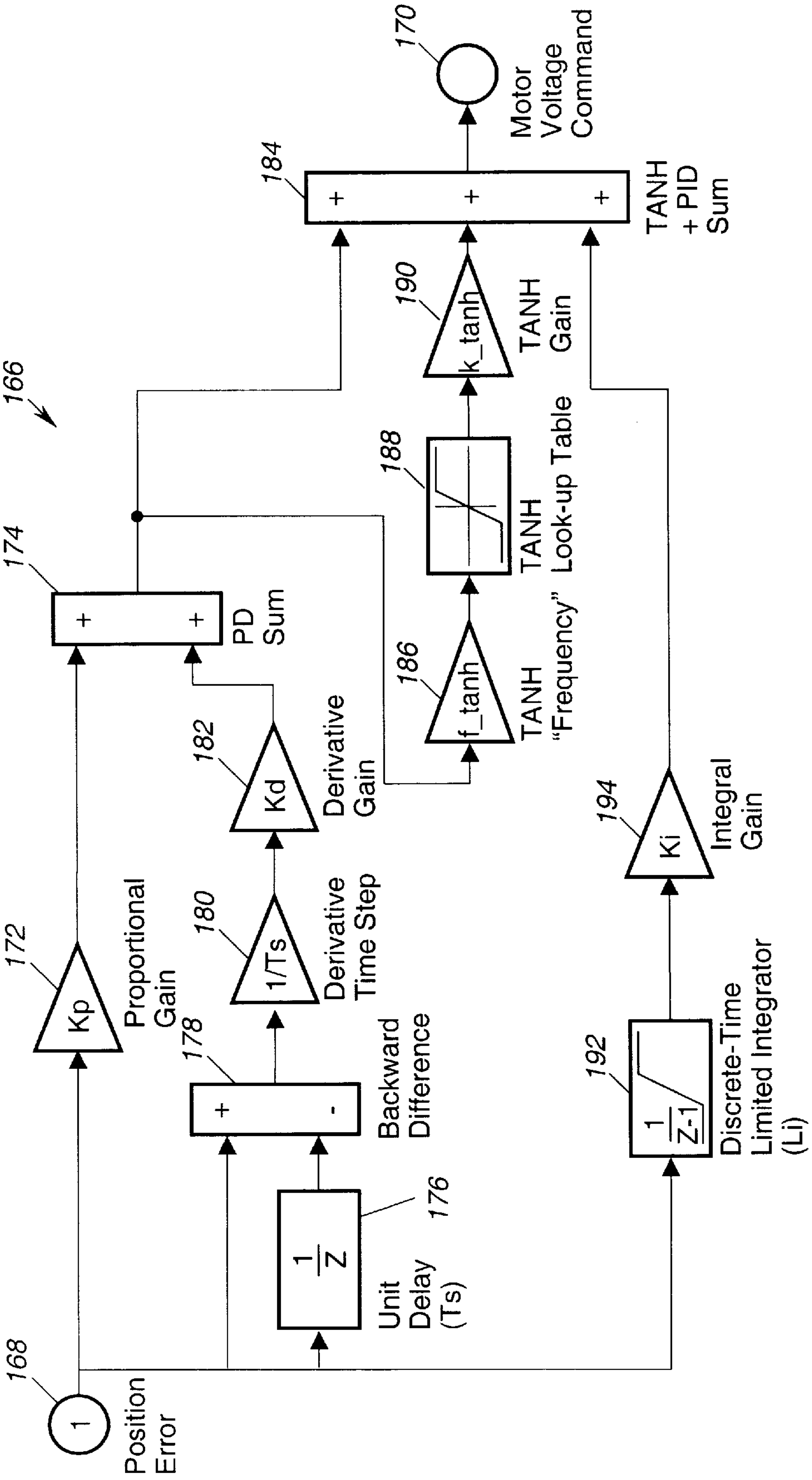
FIG. 12 is a block diagram of a controller for generating command signals to operate the motor of the azimuth drive module.

FIG. 12 depicts a control system 166 which receives as input the position error 168 and outputs a motor control command 170 which controls a motor, such as the azimuth motor 70 in azimuth drive module 26 described above.

Position error 166 is input to a multiplier 172 and multiplied by a constant Kp to output a proportional compensation term to a proportional-derivative (PD) summing circuit 174. Position error 168 is also input to a unit delay circuit 176 which delays input of the position error 168 by one sampling period. Output from unit delay circuit 176 is input to backward difference circuit 178 along with the present position error 168. Backward difference circuit determines the difference between the present position error 168 and the previous position error output by unit delay circuit 176. Output from backward difference circuit 178 is input to multiplier 180 and is multiplied by the reciprocal of the sampling period or time step 1/Ts. The output from multiplier 180 approximates the derivative of the position error and is input to multiplier 182 and multiplied by constant Kd to yield the derivative compensation term. Multiplier 182 outputs the derivative compensation term to PD summing circuit 174. PD summing circuit 174 determines the sum of the proportional compensation term and the derivative compensation term.

The output from PD summing circuit 174 is input to summing circuit 184. Output from PD summing circuit 174 is also input to multiplier 186 and multiplied by constant f_tanh. Multiplier 186 is used to effect a desired slope associated with the nonlinear hyperbolic tangent function gain. Output from multiplier 186 is input to hyperbolic tangent function (tanh) 188. Tanh may be implemented as a look-up table or a mathematical function, in accordance with particular design considerations. Output from tanh function 188 is input to multiplier 190 and multiplied by constant k_tanh. Multiplier 190 is used to limit the response of the nonlinear hyperbolic tangent function gain.

Position error 168 is also input to discrete-time limited integrator 192. Limited integrator 192 integrates the position error 168 over the history of operation of control system 166. Output from discrete-time limited integrator 192 is input to multiplier 194 and multiplied by constant Ki to output an integral compensation term to summing circuit 184. Summing circuit 184 adds the proportional-derivative term, the hyperbolic tangent term, and the integral compensation term to generate motor torque command 170. One skilled in the art will recognize that summing circuit 184 may alternatively be replaced by a comparator to select the larger of the hyperbolic tangent term and the proportional-derivative term before a summing of this larger value with the integral term. One skilled in the art will recognize that this modification would not substantially affect the performance of the controller.

With particular reference to generation of the hyperbolic tangent term, one skilled in the art will recognize that the hyperbolic tangent (tanh) term approaches plus one and negative one for large positive and negative values, respectively. For values close to zero, the tanh term approaches zero. Thus, the tanh term function becomes more pronounced with respect to the proportional, derivative, and integral compensation terms when position error 168 is below a threshold. The f_tanh constant determines this threshold. Conversely, when position error 168 is above a threshold, the tanh function plays a lesser role with respect to the proportional, derivative, and integral compensation terms in the generation of motor voltage command 170.

The tanh function 188 is selected for its substantial approximation of the friction of the gimbal drive module system 10. One skilled in the art will recognize that as an alternative to the hyperbolic tangent function, related mathematical functions which have a dominant sigmoidal or "s" shape characterized by lower and upper bounds, a nondecreasing behavior, and a zero crossing at zero input, could also be utilized with substantially the same effect. For example, the inverse tangent function is suitably sigmoidal. Use of the tanh function 188 in control system 166 enables generation of motor control command 170 to generate a torque which closely approximates opposition to the resistance torque due to friction, which may be simulated by a Dahl friction model. The tanh function substantially compensates for the Dahl friction behavior. Further, the f_tanh 186 and the k_tanh 190 constants cooperate to maintain fine position regulation of a drive module, such as azimuth drive module 26, by minimizing position error 168. In particular, the f_tanh constant scales the input to tanh function 188 to minimize position error. The greater the value of f_tanh, the more responsive control system 166 is to small position errors. Conversely, the lower the value of f_tanh, the less responsive control system 166 is to low position error values. The k_tanh multiplier 190, on the other hand, modifies the output of the tanh function 188 so as to bound the magnitude of motor torque to regulate the position error 168 against frictional effects. The greater the value of k_tanh, the greater the magnitude of friction that may be overcome in position error 168. The smaller the value of k_tanh, the less the magnitude of friction that may be effectively overcome in regulating position error 168. By analogy, control system 166 resembles a device settling into a mechanical notch at the desired position. The width of the notch is determined by the f_tanh constant, and the depth of the notch is determined by the k_tanh constant, Control system 166 may be tuned by setting the hyperbolic tangent gain constant k_tanh to the greater of the largest total friction and biasing torque experienced by the assembly being controlled, such as azimuth drive module 26. The hyperbolic tangent frequency f_tanh can then be set equal to four times the inverse of the travel range over which the friction effects are expected to be nonlinear. Further, the integral gain constant Ki of the integral term can be increased to several orders of magnitude higher than the proportional gain constant Kp or derivative gain constant Kd, while the saturation limit of the integrator Li should be decreased until the maximum output of the integral term is greater than the maximum biasing torque experience by azimuth drive module 28. This preliminary tuning enables initial gains to be selected which are then further tuned by trial and error techniques to achieve the desired system response.

From the foregoing description, one can readily see that the two-axis drive module system of the present invention provides a novel system for accurately pointing a transmitter and/or receiver of electromagnetic or optical energy. In particular, a lightweight composite elbow having a high stiffness and a high resistance to thermal expansion is combined with a low friction system, a high resolution encoder, and a nonlinear controller for accurately displacing the elbow. The drive module includes an angled tubular support which is lightweight, extremely resistant to thermal expansion, and extremely stiff. A drive module assembly enables displacement of the elbow. The drive module assembly has a low profile to minimize space requirements and rotational inertia. A control system generates torque commands that compensate for friction in a novel manner to precisely regulate the elbow displacement.

Although the invention has been described with particular reference to certain preferred embodiments thereof, variations and modifications can be effected with the spirit and scope of the following claims.

What is claimed is:

1. A drive module, comprising:

a drive motor having a fixed assembly and a displaceable assembly for movement relative to the fixed assembly, the fixed and displaceable assemblies being arranged in a generally concentric tubular configuration and having a large bore diameter;

a generally tubular support at least partially inserted into an interior of the drive motor in a concentric arrangement and being operatively connected to an inner diameter of the displaceable assembly and moving in accordance therewith, the generally tubular support having a large bore diameter;

a first leg; and a second leg attached at a joint to the first leg to form an angle between the first and second legs;

wherein the first and second legs of the tubular support are formed of a composite material.

2. The apparatus of claim 1, further comprising:

an encoder disk operatively connected to the tubular support and moving in accordance therewith, the encoder disk having formed thereon displacement indicia; and a read station for emitting light through the position encoder disk and receiving light transmitted through the encoder disk, the read station generating an output signal in accordance with the transmitted light, wherein the encoder disk is generally annularly shaped and operatively connected to an exterior of the generally tubular support.

3. The apparatus of claim 2 wherein the transmitted light forms an interferrometric pattern in accordance with light interacting with the displacement indicia, the interferrometric pattern varying in accordance with a magnitude of displacement of the displaceable assembly.

4. The apparatus of claim 1 wherein the tubular support has a bore diameter of at least five inches.

5. The apparatus of claim 1 wherein the tubular support further comprises:

a first tubular shaft bonded to the first leg opposite the joint; and a second tubular shaft bonded to the second leg opposite the joint.

6. The apparatus of claim 5 wherein the first and second tubular shafts are formed of titanium.

7. The apparatus of claim 1 wherein the drive motor further comprises:

a rotor operatively connected and moving in accordance with the displaceable assembly;

a stator operatively connected to and moving in accordance with the fixed assembly, and a magnetic field device associated with the stator, the magnetic field device being variably energized to displace the rotor relative to the stator to correspondingly displace the displaceable member, wherein the drive motor is generally annularly shaped and receives within the annular shape the generally tubular support.

8. The apparatus of claim 1 further comprising a second bearing set disposed between the fixed assembly and the displaceable assembly, the second bearing set having an inner race and an outer race, the outer race being disposed in proximity to the fixed assembly and the inner race being disposed in proximity to the displaceable assembly, the second bearing set facilitating relative rotation between the fixed and displaceable assemblies, the first and second bearing sets being adjacent, the second bearing set being generally annularly shaped and operatively connected to an outside diameter of the generally tubular support.

9. The apparatus of claim 1 wherein the fixed assembly is operatively connected to a spacecraft.

10. A drive module, comprising:

a drive motor having a fixed assembly and a displaceable assembly for movement relative to the fixed assembly, the fixed and displaceable assemblies being arranged in a generally concentric tubular configuration and having a large bore diameter;

a generally tubular support at least partially inserted into an interior of the drive motor in a concentric arrangement and being operatively connected to an inner diameter of the displaceable assembly and moving in accordance therewith, the generally tubular support having a large bore diameter; and a first bearing set disposed between the fixed assembly and the displaceable assembly, the first bearing set having an inner race and an outer race, the outer race being disposed in proximity to the fixed assembly and the inner race being disposed in proximity to the displaceable assembly, the first bearing set facilitating relative rotation between the fixed and displaceable assemblies, the first bearing set being generally annularly shaped and operatively connected to an outside diameter of the generally tubular support;

wherein a portion of the inner race of the first bearing set is removed where the inner race is adjacent to the displaceable assembly to induce a preload onto the bearings.

11. A drive module comprising:

a first drive motor having a first fixed assembly and a first displaceable assembly for movement relative to the first fixed assembly, the first fixed and displaceable assemblies of the first drive motor being arranged in a generally concentric tubular configuration having a large bore diameter;

a generally tubular support at least partially inserted into an interior of the first drive motor in a concentric arrangement and being operatively connected to the first displaceable assembly and moving in accordance therewith, the generally tubular assembly having a first leg and a second leg attached at a joint to form an angle between the first and second legs, wherein the first and second legs of the tubular support are formed of a composite material, first leg of the tubular support being operatively connected to an inner diameter of the first drive motor; and a second drive motor having a second fixed assembly and a second displaceable assembly for movement relative to the second fixed assembly, the fixed and displaceable assemblies being arranged in a generally concentric tubular configuration, second leg of the tubular support being operatively connected to an inner diameter of the second drive motor.

12. The apparatus of claim 11 wherein each first and second drive motor further comprises:

an encoder disk operatively connected to the tubular support and moving in accordance therewith, the encoder disk having formed thereon displacement indicia; and a read station for emitting light through the encoder disk and receiving light transmitted through the encoder disk, the read station generating an output signal in accordance with the transmitted light wherein the encoder disk is generally annularly shaped and operatively connected to an exterior of the generally tubular support.

13. The apparatus of claim 12 wherein the transmitted light forms an interferrometric pattern in accordance with light interacting with the displacement indicia, the interferrometric pattern varying in accordance with a magnitude of displacement of the displaceable assembly.

14. The apparatus of claim 11 wherein the tubular support further comprises:

a first tubular shaft bonded to the first leg opposite the joint; and a second tubular shaft bonded to the second leg opposite the joint.

15. The apparatus of claim 14 wherein the tubular first and second tubular shafts are formed of titanium.

16. The apparatus of claim 11 wherein each drive motor further comprises a first bearing set disposed between the fixed assembly and the displaceable assembly, the first bearing set having an inner race and an outer race, the outer race being disposed in proximity to the fixed assembly and the inner race being disposed in proximity to the displaceable assembly, the first bearing set facilitating relative rotation between the fixed and displaceable assemblies, the first bearing set being generally annularly shaped and operatively connected to an outside diameter of the generally tubular support.

17. The apparatus of claim 16 wherein each drive motor further comprises a second bearing set disposed between the fixed assembly and the displaceable assembly, the second bearing set having an inner race and an outer race, the outer race being disposed in proximity to the fixed assembly and the inner race being disposed in proximity to the displaceable assembly, the second bearing set facilitating relative rotation between the fixed and displaceable assemblies, the first and second bearing sets being adjacent, the second bearing set being generally annularly shaped and operatively connected to an outside diameter of the generally tubular support.

18. The apparatus of claim 17 wherein a material is removed from adjacent portions of the inner race to induce a preload onto the bearings.

19. The apparatus of claim 11 wherein the gimbal drive module is operatively connected to a spacecraft.

20. The apparatus of claim 19 wherein the fixed assembly of the first drive motor is operatively connected to the spacecraft so that energization of the first stator causes rotation about an axis of the first leg of the generally tubular support.

21. The apparatus of claim 20 wherein the displaceable assembly of the second drive motor is operatively connected to a device so that energization of the second stator causes displacement of the device, and wherein selective energization of the first and second stators enables pointing of the device.

22. A drive module comprising:

a first drive motor having a first fixed assembly and a first displaceable assembly for movement relative to the first fixed assembly, the first fixed and displaceable assemblies of the first drive motor being arranged in a generally concentric tubular configuration having a large bore diameter;

wherein the first drive motor further includes:

a first rotor operatively connected to and moving in accordance with the first displaceable assembly;

a first stator operatively connected to and moving in accordance with the first fixed assembly; and a first magnetic field device associated with the first stator, the first magnetic field device being variably energized to displace the first rotor relative to the first stator in order to displace the first displaceable assembly; wherein the first drive motor is generally annularly shaped and receives within the annular shape the generally tubular support;

a generally tubular support at least partially inserted into an interior of the first drive motor in a concentric arrangement and being operatively connected to the first displaceable assembly and moving in accordance therewith, the generally tubular assembly having a first leg and a second leg attached at a joint to form an angle between the first and second legs, wherein the first and second legs of the tubular support are formed of a composite material, first leg of the tubular support being operatively connected to an inner diameter of the first drive motor; and a second drive motor having a second fixed assembly and a second displaceable assembly for movement relative to the second fixed assembly, the fixed and displaceable assemblies being arranged in a generally concentric tubular configuration, second leg of the tubular support being operatively connected to an inner diameter of the second drive motor.

23. A drive module comprising:

a first drive motor having a first fixed assembly and a first displaceable assembly for movement relative to the first fixed assembly, the first fixed and displaceable assemblies of the first drive motor being arranged in a generally concentric tubular configuration having a large bore diameter;

a generally tubular support at least partially inserted into an interior of the first drive motor in a concentric arrangement and being operatively connected to the first displaceable assembly and moving in accordance therewith, the generally tubular assembly having a first leg and a second leg attached at a joint to form an angle between the first and second legs, wherein the first and second legs of the tubular support are formed of a composite material, first leg of the tubular support being operatively connected to an inner diameter of the first drive motor; and a second drive motor having a second fixed assembly and a second displaceable assembly for movement relative to the second fixed assembly, the fixed and displaceable assemblies being arranged in a generally concentric tubular configuration, second leg of the tubular support being operatively connected to an inner diameter of the second drive motor;

wherein the second drive motor further includes:

a second rotor operatively connected to and moving in accordance with the second displaceable assembly;

a second stator operatively connected to and moving in accordance with the second fixed assembly; and a second magnetic field device associated with the second stator, the second magnetic field device being variably energized to displace the second rotor relative to the second stator in order to displace the second displaceable assembly; wherein the second drive motor is generally annularly shaped and receives within the annular shape the generally tubular support.

* * * * *